United States Patent [19]
Krause et al.

[11] Patent Number: 4,996,876
[45] Date of Patent: Mar. 5, 1991

[54] MICRORHEOSCOPIC DETECTOR FOR GAS FLOWS

[75] Inventors: Hans Krause, Bad Nauheim; Albert Randow, Bruchkoebel, both of Fed. Rep. of Germany

[73] Assignee: Leybold Aktiengesellschaft, Fed. Rep. of Germany

[21] Appl. No.: 450,034

[22] Filed: Dec. 13, 1989

Related U.S. Application Data

[63] Continuation-in-part of Ser. No. 358,129, May 30, 1989, abandoned.

[30] Foreign Application Priority Data

Dec. 16, 1988 [DE] Fed. Rep. of Germany ....... 3842399

[51] Int. Cl.$^5$ .............................................. G01F 1/68
[52] U.S. Cl. .............................. 73/204.25; 73/25.05; 250/343
[58] Field of Search ........... 73/204.16, 204.19, 204.22, 73/204.25, 204.26, 204.27, 25.03, 25.04, 205.05; 250/343, 352

[56] References Cited

U.S. PATENT DOCUMENTS

| | | |
|---|---|---|
| Re. 30,105 | 10/1979 | Rodder . |
| 1,222,492 | 4/1917 | Thomas . |
| 1,769,358 | 7/1930 | Pinkerton et al. . |
| 3,888,110 | 6/1975 | Clark . |
| 4,024,761 | 5/1977 | Djorup ............................ 73/204.26 |
| 4,154,087 | 5/1979 | Schunk et al. .................. 73/204.25 |
| 4,478,077 | 10/1984 | Bohrer ............................ 73/204.16 |
| 4,542,650 | 9/1985 | Renken ........................... 73/204.26 |

FOREIGN PATENT DOCUMENTS

| | | |
|---|---|---|
| 858777 | 10/1952 | Fed. Rep. of Germany . |
| 2557237 | 6/1977 | Fed. Rep. of Germany . |
| 2656487 | 6/1978 | Fed. Rep. of Germany . |
| 3046234 | 7/1982 | Fed. Rep. of Germany . |
| 3529482 | 2/1987 | Fed. Rep. of Germany . |
| 244631A1 | 4/1987 | German Democratic Rep. . |

OTHER PUBLICATIONS

"Empfindlichkeit und Rauschen beim Di-ferential-Hitzdraht-Anemometer", (Sensitivity and Noise in the Differential-Hot Wire-Anemometer), Technisches Messen 48, Jahrgang 1981, Heft 11, pp. 367–374.

Primary Examiner—Herbert Goldstein
Attorney, Agent, or Firm—Hill, Van Santen, Steadman & Simpson

[57] ABSTRACT

A microrheoscopic detector for gases including two thin wire resistance thermometers and a heating conductor disposed between the two resistance thermometers, the resistance thermometers being positioned in the area of influence of the heating conductor and spaced therefrom in a definite spatial fixation, the heating conductor having a span transverse gas flow path and comprising a plurality of parallel conductor legs laying in the span in the same plane as the resistance thermometers.

21 Claims, 2 Drawing Sheets

MICRORHEOSCOPIC DETECTOR FOR GAS FLOWS

The present application is a continuation-in-part application of U.S. Serial No. 358,129, filed May 30, 1989, now abandoned.

BACKGROUND OF THE INVENTION

The invention generally relates to a sensor or hot wire anemometer for measuring the flow of a gas, especially for infrared gas analysis apparatus. More particularly, the invention relates to a microrheoscopic detector composed of an elongated, current-carrying heating conductor oriented perpendicularly relative to the direction of flow of the gas and elastically suspended at at least one side and composed of resistance thermometers on opposite sides of the heating conductor in the influencing region of the heating conductor, the resistance thermometers being composed of thin wires and lying in the same plane as the heating conductor, the resistance thermometers being located essentially parallel to and at a distance from the heating conductor, and having ends connected to intermediate wires.

In an article entitled "Reverse Flow Sensing Hot Wire Anemometer," that is published in Journal of Physics E; Scientific Instruments 1972, Vol. 5, No. 9, pp. 849-851 (Sept. 1972), the teachings of which are fully incorporated herein by reference, there is disclosed a microrheoscopic detector including the resistance thermometers that are held at both sides of a heating conductor by leads, but independently of this heating conductor. The respective planes in which the resistance thermometers and the heating conductor are situated are oriented perpendicularly relative to one another, this alone making it possible to secure the lead wires to the heating conductor, while requiring acceptance of further disadvantages. Due to the perpendicular arrangement of the resistance thermometers relative to the heating conductor, essentially only one flow direction is acquirable, namely, the flow perpendicular to the resistance thermometers and the heating conductor. Since the wires are separated by a great distance between one another over the major part of their length, the sensor has a high time constant that is unacceptable for numerous applications. Moreover, the measured signal is overridden by high noise signals, particularly given low flow rates. As proceeds from the article, the known system is suitable for very high flow rates of about 25 m per second, i.e. roughly motor vehicle speed.

In German application DE-AS 20 52 645, there is disclosed a thermal-electric anemometer including two thermal elements, one being in communication with a heating wire. However, such a measuring instrument is only suitable for relatively high flow rates in the range between 0.5 and 10 m per second. The purpose of the anemometer is to measure air speeds of the type that appear behind a motor vehicle radiator, or at the discharge opening of a heater, an air cooler, or a defroster.

Some physical measuring methods are concerned with measuring extremely low, pulsating pressures or volume streams in gases that are several orders of magnitude smaller than the above-described anemometers. Included among these, for example, are infrared gas analysis, leakage measurements in low sensitivity regions, respiratory measurements in medicine, or other measurements having extremely low gas consumption on the basis of a physical event.

Microrheoscopic detectors of the type described in the first paragraph are referred to as hot wire anemometers and can be used for the measurement of gas volume flows. A high speed microrheoscopic detector for gases is defined as a means of a flow measuring system for extremely small volume streams the functioning elements of which are constituted by two or more solid structures that are temperature-coupled via a gas path; a heated solid state structure that, for example, can be a relatively inert, massive part, generates a hot cloud in the gas to be measured, this hot cloud being capable of being described by an isotherm field. A forced flow deforms the gas cloud or, respectively, the isotherm field. A flow-proportional signal can be generated within limits by one or more low-mass temperature sensors that are arranged inside the gas cloud.

The demand for low-mass inertia temperature sensors leads, for example, to resistance thermometers composed of extremely thin resistance wires whose diameter lies between about 0.5 and $5 \times 10^{-3}$ mm. A low-mass inertia is required so that the resistance thermometers have an adequate resolution given pulsating gas flows on the order of magnitude between about 10 and 50 Hz.

When measurements are undertaken in a flow sensor for very minimal flows (i.e., microflows), care must also be taken to ensure that no free convection whatsoever can occur within the sensor that is contrary to the forced convection of the measuring effect. This requires dimensions of the active conductor volume of about 1 mm$^3$ and less. Insofar as is possible, the length of the resistance thermometers should be between 0.4 and 1.5 mm.

A microrheoscopic detector produced in accordance with the afore-mentioned demands and design rules, is a product of extreme precision manufacturing involving stringent requirements of the precision of manufacture. High production costs with a considerable corresponding high wage expenditure are thus necessarily incurred in connection therewith.

In a dissertation entitled "Schnelle Messfuehler Fuer Kleine Gasstroeme", and presented on Dec. 9, 1974 by Dr. Guenter Schunck of the University of Karlsruhe, there was disclosed a microrheoscopic detector of the type described in the first paragraph. In such microrheoscopic detector, a heating conductor and two resistance thermometers ar suspended independently of one another by lead wires, these lead wires allowing a longitudinal thermal expansion as a result of their resilient construction. While such a microrheoscopic detector completely satisfies the technical requirements and metrological demands made of it, experience has shown that it is sensitive to vibrations and is expensive to manufacture. Destruction of the sensitive resistance thermometers occasionally occurs due to the vibrations that are unavoidable in some measuring instruments. Problems also arise during assembly since the resistance thermometers must be individually secured to fused lead wires, and care must be taken to ensure that they are not mechanically over-stressed.

Finally, U.S. Pat. No. 4,154,087, the teachings of which are fully incorporated herein by reference, discloses a microrheoscopic detector for gases that includes an elongated, current-carrying conductor that is positioned perpendicularly relative to the direction of flow of a gas and is suspended elastically at at least one side and is further composed of respective resistance thermometers arranged in the influencing region of the heating conductor both preceding and following said heating conductor in the flow direction, these resistance thermometers being composed of thin wires, being held at their ends between thicker lead wires, lying in the same plane as the heating conductor, and positioned essentially parallel to and at a distance from the heating conductor, and having each of their two ends merging into the ends of lead wires, whereby the lead wires can be carried by the heating conductor. Experience has shown that this known microrheoscopic detector is particularly insensitive to vibrations and enables manufacturing thereof with relatively low waste due to rejects.

SUMMARY OF THE INVENTION

The present invention achieves a considerable increase in sensitivity over the microrheoscopic detector disclosed in U.S. Pat. No. 4,154,087, while retaining the advantages thereof. To this end, the present invention provides a microrheoscopic detector for measuring gas flows of the hot wire anemometer type wherein a heating conductor includes within its area of influence a plurality of segments. The segments are coplanar with each other. The segments can be electrically connected in parallel or in series. If connected in series, the segments are joined by means of essentially semicircular bights or bends. Resistance thermometers are located on opposite sides of the heating conductor.

In an embodiment of the invention, one end of an intermediate line connected to a resistance thermometer is connected in electrically conductive fashion to the terminal pin of a low-potential circuit, for example a differential amplifier, and to a constant-voltage source, whereas the other intermediate line connected to the other end of the resistance thermometer is in electrical communication with the base plate and, thus, with ground. The heating conductor is arranged in serpentine fashion with bights in the region of the two resistance thermometers, the two resistance thermometers being arranged on opposite sides of and parallel to the heating conductor. As a result, a plurality of segments of the heating conductor that are about equal in length are formed and arranged geometrically parallel to one another, are electrically connected in series by means of the bights, and lie in the same plane as the resistance thermometers.

In a preferred embodiment of the invention, the region of the bights or turns of the heating conductor segments that are parallel to one another, the heating conductor preferably is secured to insulating members. Additionally, the pairs of intermediate lines that lie opposite one another are also connected to the insulating members.

The insulating members are advantageously formed of glass beads into which the heating conductor and/or the intermediate lines are fused.

In an alternate embodiment of the invention, one end of each intermediate line connected to a resistance thermometer is electrically connected to the terminal pin of a low-potential circuit, for example a differential amplifier, and to a constant-voltage source. The other intermediate line connected to the other end of each resistance thermometer, in turn, is coupled to the base plate and, thus, with ground. The heating conductor is divided into a plurality of heating conductor segments formed and arranged essentially parallel to one another in the plane of the resistance thermometers, these heating conductor segments being coupled at the ends thereof via electrically conductive yokes arranged roughly transversely relative to the heating conductor segments.

These and other features and advantages will become apparent from the following description of the preferred documents thereof, taken in conjunction with the accompanying drawings.

DETAILED DESCRIPTION OF THE PRESENTLY PREFERRED EMBODIMENTS

Figure 1:
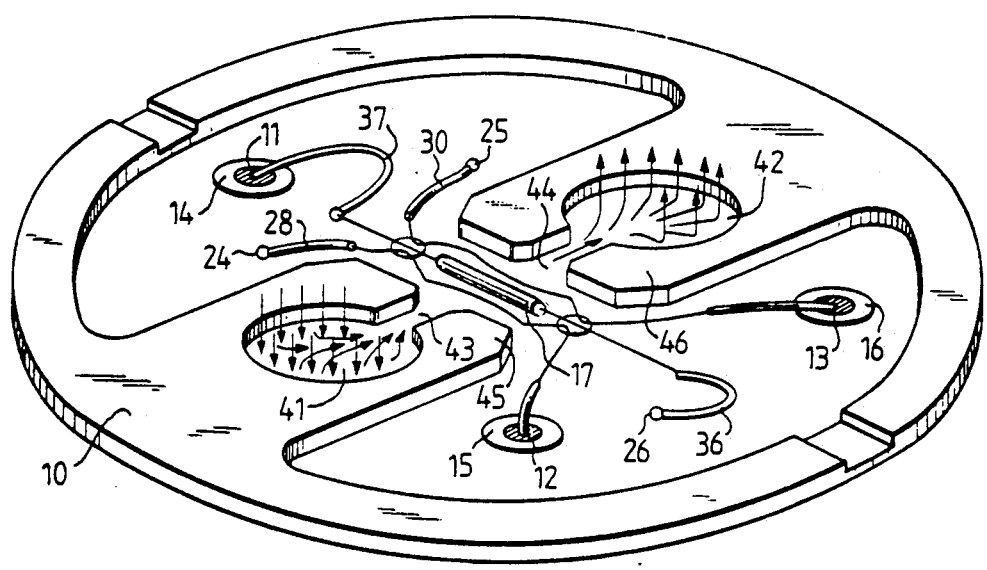
FIG. 1 is a perspective view of a microrheoscopic detector embodying principles of the invention that is integrated in a measuring instrument for an infrared gas analyzer.
Figure 2:
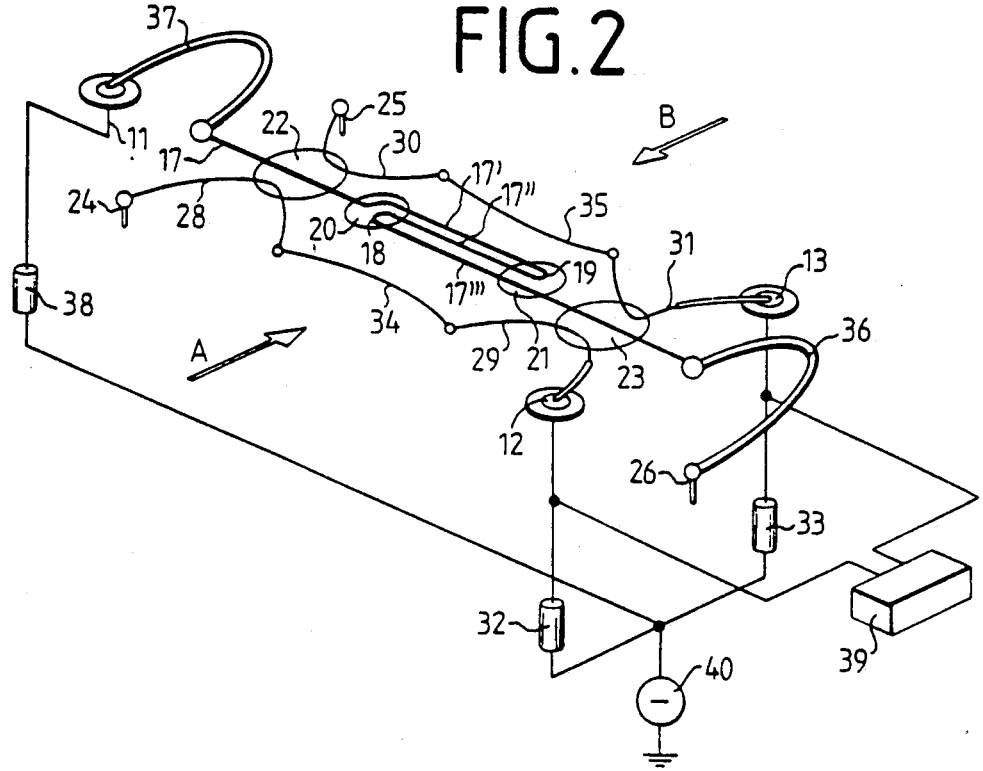
FIG. 2 is an enlarged, perspective view of the heating conductor and of the resistance thermometers of the sensor of FIG. 1 together with appertaining low-potential circuit.

In FIGS. 1 and 2 there is illustrated a microrheoscopic detector embodying principles of the invention. In FIG. 1, the sensor is integrated into a measuring instrument for infrared gas analysis.

As illustrated, a base plate 10 includes bushing insulators 14, 15, and 16, in which terminal pins 11, 12, and 13 are inserted, respectively. The terminal pins 11, 12, and 13 serve to supply a filament or testing current to a heating conductor 17 and to two resistance thermometers 34 and 35. Further terminal pins 24, 25, and 26 are provided to connect the two ends of two intermediate conductors or wires 28 and 30 and one end of the heating conductor 17, or, respectively, its terminal clip 36 to the base plate 10, and thus, to ground.

At approximately the mid-point along the length of the heating conductor 17, the heating conductor 17 is so constructed and arranged that it includes several bends or bights 18 and 19 such that a total of three segments 17', 17", and 17"' are formed that are positioned essentially parallel relative to each other. The bights 18 and 19 are fixed in position by means of being mounted in and affixed to insulating members 20 and 21, respectively.

The two resistance thermometers 34 and 35 have the ends thereof soldered to intermediate wires 28 and 29, or 30 and 31, respectively, that are in turn secured to the insulating members 22 and 23. Accordingly, the heating conductor and resistance thermometers lie in one plane that is parallel to the plane of the base plate 10.

Positioned at both sides of the heating arrangement of the heating conductor 17 and the resistance thermometers 34 and 35 illustrated in FIGS. 1 and 2, are two chambers 41 and 42 having exit openings 43 and 44, respectively, with which the arrangement of the heating conductor 17 and resistance thermometers 34 and 35 is aligned. The chambers 41 and 42, as well as the exit openings 43 and 44, are formed in appropriate planar segment numbers 45 and 46 that are positioned symmetrically opposite one another.

It can be appreciated that the arrangement of FIG. 1 actually continues in an upward direction in a housing (not illustrated) in which gas-filled larger chambers and connecting channels are arranged, these forming the chambers 41 and 42. Given alternate, periodic absorption of radiant energy, for example, infrared radiation, these larger chambers generate a flow that pulsates back and forth between the chambers 41 and 42, whereby the arrangement is charged by the gas flow being formed through the exit openings 43 and 44.

In conjunction with the heating conductor 17 and spring clips 36 and 37 supporting same, the arrangement according to FIG. 2, the elements of which all lie in a single plane, forms a self-sustaining unit that merely has to be connected during assembly to the terminal pins 11, 12, and 13, or respectively, to the base plate 10 by means of the terminal pins 24, 25, and 26. As such, the unit is easily assembled.

During operation of the microrheoscopic detector (microanemometer), for example, within the framework of an infrared gas analyzer, a pulsating, alternating flow in the directions of the arrows A and B, is established. As a result of these flows, an isotherm field developed coaxially relative to the heating conductor 17 is disturbed in a defined manner, whereby the resistance thermometer 34 or 35, against which the flow first occurs, (i.e., the "upflow" resistance thermometer) is cooled. Due to this effect, the preset symmetry of a bridge circuit is disturbed, the bridge circuit being formed of the resistance thermometers 34 and 35, resistors 32 and 33, constant voltage source 40, and an amplifier 39 to which a voltmeter calibrated for the metro ogical processing of the changes in resistance of the resistance thermometers is coupled to indicate the change in voltage. The bridge voltage is applied by the source 40 to the terminals 12 and 13 through the resistor 32 and 33, respectively. The same voltage is applied to the heating conductor 17 through the resistor 38. The resistance of the resistors 32, 33, and 38 are much greater than those of the resistance thermometers 34 and 35 and the heating conductor 17. The measurement of the changes in resistance is derived on the basis of line management that is well-known to those of skill in the relevant art. Accordingly, the details of the basis are not set forth herein.

With respect to the diameter of the wires employed to form the resistance thermometers 34 and 35, the thicknesses of same lie between about 0.5 and $5 \times 10^{-3}$ mm, and preferably are about $1 \times 10^{-3}$ mm. The diameters of the intermediate wires lie between about 10 and $20 \times 10^{-3}$ mm.

Due to the interaction of the heating conductor segments 17', 17", and 17"', with one another, the measuring effect is intensified in that the temperature coefficient of the electrical resistance, given impressed current activity, actively shifts the power in the segments of the heating conductor toward that side facing away from the flow since more work is performed there due to the increase of resistance in the wire resulting from a higher temperature. The following equation thus is descriptive of this function:

$$L = U \times I = R \times I^2 = I^2 \times R(T); \text{ where } L = \text{ps power or wattage, } U = \text{voltage, } I = \text{current, } R = \text{resistance, and } T = \text{temperature.}$$

Accordingly, power dissipated (L) is a function of temperature (T).

Figure 3:
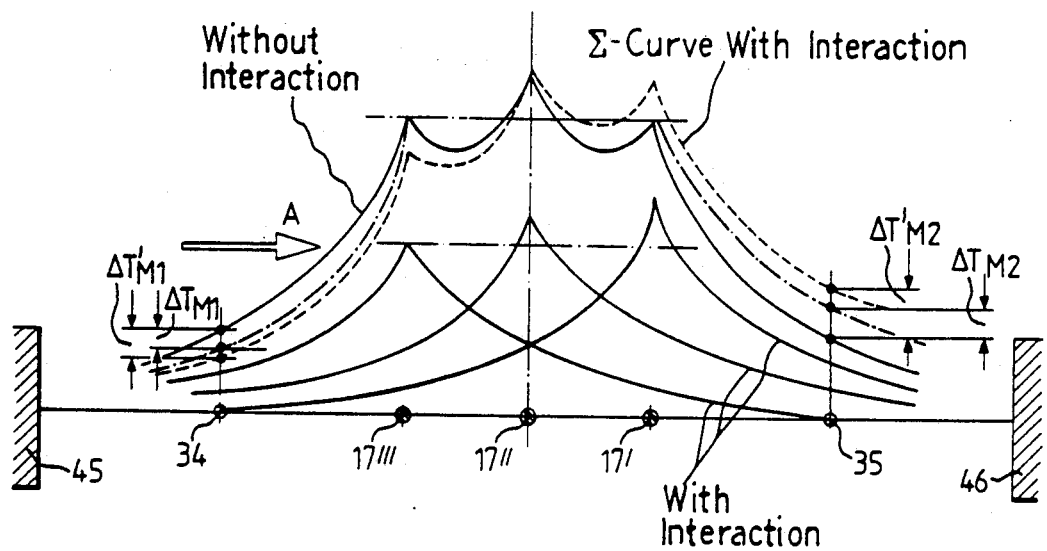
FIG. 3 is a diagrammatic illustration of the temperature distribution of the two resistance thermometers and of the heating conductor of the sensor of FIGS. 1 and 2.

As an example, with reference to FIG. 3, it is assumed that gas flows in the direction of the arrow A, i.e., from left to right in the illustration. In such case, a temperature shift corresponding to the curves entered above the wires 34, 17"', 17", 17', and 35 ensues. It can be appreciated that the change in temperature $T'm_1$ deviates from the change $Tm_1$ and that the change $T'm_2$ deviates from the change $Tm_2$. The extent of deviation indicates the measurable physical effect. It can be appreciated that the materials used for the resistance thermometers 34 and 35 should exhibit an optimally great temperature coefficient of the electrical resistance. When the heating conductor segments are electrically connected in parallel (described below in connection with FIG. 4), the temperature coefficient should be negative (for example, carbon fiber). When the heating conductor sections are electrically connected in series, for example the bight arrangement illustrated in FIG. 2, the temperature coefficient should be positive (for example, platinum). This ensures that the flow of the heating capacity distribution into the individual heating conductor shifts such that the electrical power is co-coupled.

Figure 4:
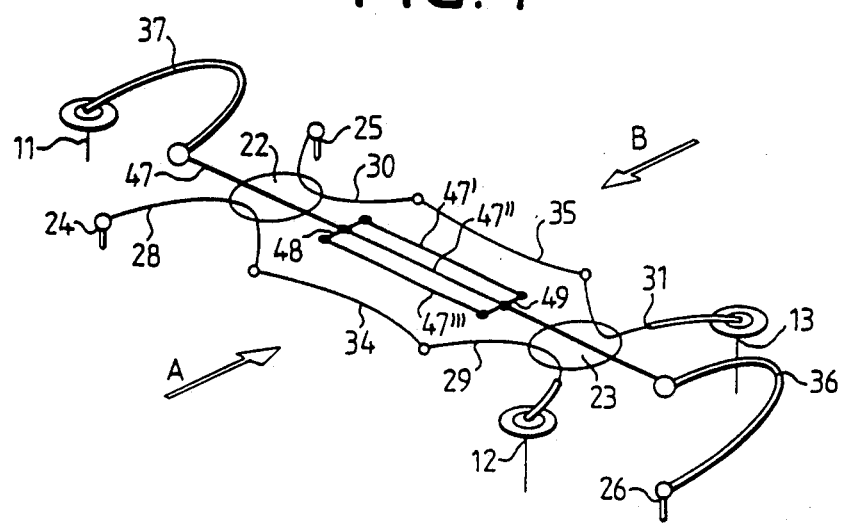
FIG. 4 is another embodiment of a heating conductor of a microrheoscopic detector embodying principles of the invention.

As illustrated in FIG. 4, the heating conductor 17, in an alternate embodiment of the invention, can be fashioned such that the plurality of bends 18 and 19 are replaced by a plurality of separate heating conductor segments 47', 47", and 47"' (at least two ar needed) in a single plane in side-by-side physical and electrical parallel arrangement. These segments are then connected to one another via short wire or yoke segments 48 and 49. The yoke segments 48 and 49 are in turn soldered or welded to the heating conductor 47.

While a preferred embodiment has been shown, modifications and changes may become apparent to those skilled in the art which shall fall within the spirit and scop of the invention. It is intended that such modifications and changes be covered by the attached claims.

We claim:

1. A microrheoscopic detector for sensing a gas flow, comprising:
   (a) a base plate member that is coupled to an electrical ground;
   (b) a current carrying heating conducting member positioned in and supported on said base plate member, said heating conductor member being elongated and resiliently suspended by at least one end, said heating conductor being oriented perpendicularly to a gas flow path, said heating conductor having a region of heating influence, said heating conductor at approximately a midsection thereof being arranged in bending fashion and including at least two bights so as to form at least three segments of approximately equal length and essentially of parallel arrangement, said heating conductor segments laying in a single plane;
   (c) resistance thermometers located essentially parallel to and on opposite sides of said heating conductor and within said area of influence, said resistance thermometers laying in the same plane of said heating conductor segments; and
   (d) intermediate wires coupled to opposite ends of said resistance thermometers, each resistance thermometer end having an intermediate wire coupled thereto, one intermediate wire of each resistance thermometer being coupled to a low potential circuit and to a constant voltage source, the other intermediate wire of each resistance thermometer wire being coupled to ground.

2. The microrheoscopic detector of claim 1, wherein the low potential circuit comprises a differential amplifier coupled between said intermediate wires.

3. The microrheoscopic detector of claim 1, wherein ends of the heating conductor segments, including the bights, are secured within insulating members and said intermediate wires are supported by means of further insulating members.

4. The microrheoscopic detector of claim 3, wherein the insulating members comprise glass beads into which the ends of the heating conductor segments or the intermediate wires are fused.

5. A microrheoscopic detector for sensing a gas flow, comprising:
(a) a base plate member that is coupled to an electrical ground;
(b) a current carrying heating conducting member positioned in and supported on said base plate member, said heating conductor member being elongated and resiliently suspended by at least one end, said heating conductor being oriented perpendicularly to a gas flow path, said heating conductor having a region of heating influence, said heating conductor at approximately a midsection thereof including segments of approximately equal length and essentially of parallel arrangement, said heating conductor segments laying in a single plane;
(c) means for operatively connecting said segments in electrically parallel fashion;
(d) resistance thermometers located essentially parallel to and on opposite sides of said heating conductor and within said area of influence, said resistance thermometers laying in the same plane of said heating conductor segments; and
(e) intermediate wires coupled to opposite ends of said resistance thermometers, each resistance thermometer end having an intermediate wire coupled thereto, one intermediate wire of each resistance thermometer being coupled to a low potential circuit and to a constant voltage source, the other intermediate wire of each resistance thermometer being coupled to ground.

6. The microrheoscopic detector of claim 5, wherein the low potential circuit comprises a differential amplifier coupled between said intermediate wires.

7. The microrheoscopic detector of claim 5, wherein ends of said heating conductor segments are secured within insulating members.

8. The microrheoscopic detector of claim 7, wherein the insulating members comprise glass beads into which the ends of the heating conductor segments are fused.

9. The microrheoscopic detector of claim 5, wherein the means for connecting the heating conductor segments comprise a plurality of yoke members positioned transversely relative to said heating conductor.

10. In a microrheoscopic detector for gases including: a base; a heating conductor; means mounting the heating conductor to the base; two resistance thermometers each comprising thin wire; and means connected only to the ends of the thin wires for mounting the resistance thermometers in the area of influence of the heating conductor and spaced therefrom in a definite spatial fixation comprising thicker connecting wires, conductively connected to the ends of the thin wires und affixed to the heating conductor, the improvement comprising: said heating conductor having a span transversing gas flow path and comprising a plurality of parallel conductor legs lying in said span in the same plane as said resistance thermometers.

11. The microrheoscopic detector of claim 10, wherein the heating conductor legs are formed by arranging said heating conductor in serpentine fashion so that said legs are coupled electrically in series by means of bights formed in said heating conductor.

12. The microrheoscopic detector of claim 10, wherein said portions of said resistance thermometers are secured within insulating members.

13. In a microrheoscopic detector for gases including:
a base;
a heating conductor;
means mounting the heating conductor to the base;
two resistance thermometers each comprising thin wire; and
means connected only to the ends of the thin wires for mounting the resistance thermometers in the area of influence of the heating conductor and spaced therefrom in a definite spacial fixation comprising thicker connecting wires, conductively connected to the ends of the thin wires, the improvement comprising:
said heating conductor having a span transverse gas flow path and comprising a plurality of parallel conductor legs laying in said span in the same plane as said resistance thermometers, said heating conductor legs being connected electrically in parallel.

14. The microrheoscopic detector of claim 13, wherein ends of said heating conductor legs are secured within insulating members.

15. In a microrheoscopic detector for gases including:
a base;
a heating conductor;
means mounting the heating conductor to the base;
two resistance thermometers each comprising thin wires; and
means connected only to the ends of the thin wires for mounting the resistance thermometers in the area of influence of the heating conductor and spaced therefrom in a definite spacial fixation comprising thicker connecting wires, conductively connected to the ends of the thin wires, the improvement comprising:
said heating conductor having a span transverse a gas flow path and comprising a plurality of parallel legs laying in said span in the same plane as said resistance thermometers, said heating conductor segments comprising separate segments operatively connected together at ends thereof so as to be coupled electrically in parallel.

16. A microrheoscopic detector for gases comprising:
(a) a base;
(b) a heating conductor, said heating conductor having an area of influence and including a plurality of segments arranged physically essentially in parallel fashion in the area of influence;
(c) means mounting the heating conductor to the base;
(d) two resistance thermometers each comprising thin wire located on opposite sides of said conductor, said resistance thermometers being located essentially in parallel spaced apart fashion from said heating conductor within said area of influence; and
(e) means connected only to ends of the thin wires for mounting the resistance thermometers in the area of influence of the heating conductor and spaced therefrom in a definite spacial fixation comprising thicker intermediate wires, one intermediate wire of each resistance thermometer being connected to a low-potential circuit and a constant voltage source, the other intermediate wire of each resistance thermometer being connected to electrical ground.

17. The microrheoscopic detector of claim 16, wherein the low potential circuit comprises a differential amplifier coupled between said intermediate wires.

18. The microrheoscopic detector of claim 16, wherein ends of the heating conductor segments are secured within insulating members and said intermediate wires are supported by means of further insulating members.

19. The microrheoscopic detector of claim 17, wherein the insulating members comprise glass beads into which the ends of the heating conductor segments and the intermediate lines are fused.

20. The microrheoscopic detector of claim 16, wherein the heating conductor is arranged in serpentine fashion to form said segments such that said segments are connected in series by means of bights.

21. The microrheoscopic detector of claim 16, wherein the heating conductor segments are separately formed and connected electrically in parallel by means of electrical connections on opposite ends of said segments.

* * * * *